United States Patent
Cornelius et al.

(10) Patent No.: US 7,056,960 B2
(45) Date of Patent: Jun. 6, 2006

(54) INK-JET RECEPTIVE INKS FOR PRINTING ON TO CD-R SUBSTRATES

(75) Inventors: William Frank Cornelius, Kansas City, MO (US); Reiner Zimmer, Rees (DE)

(73) Assignee: Sericol Limited, Kent (GB)

( * ) Notice: Subject to any disclaimer, the term of this patent is extended or adjusted under 35 U.S.C. 154(b) by 123 days.

(21) Appl. No.: 10/311,426

(22) PCT Filed: Jun. 7, 2001

(86) PCT No.: PCT/IB01/01192

§ 371 (c)(1),
(2), (4) Date: Jul. 9, 2003

(87) PCT Pub. No.: WO01/96121

PCT Pub. Date: Dec. 20, 2001

(65) Prior Publication Data

US 2004/0027439 A1 Feb. 12, 2004

Related U.S. Application Data

(60) Provisional application No. 60/211,785, filed on Jun. 16, 2000.

(51) Int. Cl.
*C08F 2/46* (2006.01)
*C09D 133/02* (2006.01)

(52) U.S. Cl. ............................ 522/81; 522/83; 522/84; 522/85; 522/86

(58) Field of Classification Search ................... 522/81, 522/83, 84, 85, 86
See application file for complete search history.

(56) References Cited

U.S. PATENT DOCUMENTS

| | | | |
|---|---|---|---|
| 4,024,040 A * | 5/1977 | Phalangas et al. ............. | 522/27 |
| 4,443,576 A * | 4/1984 | Bhattacharyya et al. .... | 524/522 |
| 4,857,610 A * | 8/1989 | Chmelir et al. ................ | 526/88 |
| 5,013,768 A * | 5/1991 | Kiriyama et al. .............. | 522/64 |
| 5,395,659 A * | 3/1995 | Graf et al. ................ | 427/407.1 |
| 5,616,447 A * | 4/1997 | Arioka ................... | 430/270.11 |
| 5,891,950 A * | 4/1999 | Collins et al. ............... | 524/502 |
| 6,548,571 B1 * | 4/2003 | Cheng et al. ................ | 523/160 |
| 6,916,862 B1 * | 7/2005 | Ota et al. .................... | 523/200 |
| 2003/0035932 A1 * | 2/2003 | Yamamoto et al. ......... | 428/195 |

FOREIGN PATENT DOCUMENTS

| | | |
|---|---|---|
| EP | 0 709 438 | 5/1996 |
| EP | 10 849 728 | 6/1998 |
| WO | WO 93/04096 * | 3/1993 |
| WO | WO 99/21724 | 5/1999 |

OTHER PUBLICATIONS

Patent Abstracts of Japan, 2000 034435 Feb. 2, 2000.
Encyclopedia of Chemical Technology, 3rd Edition, vol. 22; "Sulfonic Acids" pp. 53–55.

* cited by examiner

*Primary Examiner*—Susan Berman
(74) *Attorney, Agent, or Firm*—Reed Smith LLP

(57) ABSTRACT

An ink is disclosed for producing an ink jet print receptive surface on coated or coated polymer substrates such as CD-R substrates. The ink comprises a solid water soluble salt of acrylamidoalkanesulfonic acid, one or more ethylenically unsaturated monomers or oligomers capable of being photopolymerized by ultra-violet radiation, one or more functional extender pigments, and one or more photoinitiators. A modified silicone may be added to the ink to control the spread of the ink-jet print and the print definition. The inks are hardened by exposure to ultra-violet light. The ink may be over-printed with thermal drop-on-demand ink-jet printers.

25 Claims, No Drawings

INK-JET RECEPTIVE INKS FOR PRINTING ON TO CD-R SUBSTRATES

CROSS-REFERENCES TO RELATED APPLICATIONS

This application claims priority of International Application No. PCT/IB01/01192 filed Jun. 7, 2001 and provisional application no. 60/211,785 filed Jun. 16, 2000, the complete disclosure of which are hereby incorporated by reference.

This invention concerns coatings curable by ultraviolet radiation, which may be printed on to polymer substrates to provide a thermal drop-on-demand ink-jet receptive layer.

This invention is particularly advantageous in the case of Recordable Compact Discs (known as 'CD-R's') or Recordable Digital Versatile Discs (known as 'DVD-R's') to give a coating that will be receptive to ink-jet inks used to mark or code data after recording. Recordable Compact Discs can be moulded from polycarbonate, acrylic or polyester polymers, but polycarbonate is generally the preferred choice.

Polycarbonate is a thermoplastic resin which is commercially available under various designations, such as, for example, "Lexan" (a trade name of the General Electric Company), and it is used as a polymer to form compact discs. In the manufacture of compact discs, the disc is first moulded and then coated first with a light sensitive layer and then a fine layer of aluminum to produce a reflective layer. With Recordable Compact Discs the coatings are protected with a layer of clear uv-curable lacquer using a spin-coating process (the spin-coat lacquer) which becomes a print surface. With some constructions of Recordable Digital Versatile Discs, two discs are laminated together and the print surface is the polymer itself.

In the case of CD-R's, after the disc has been used to record data, the disc will need to be marked by the user in order to identify the recorded data. Marking of the disc can be by, for example, manual use of a suitable writing implement, such as, for example, a felt-tip, or, increasingly, by use of an ink-jet printer. Spin-coat lacquers are not generally receptive to marking inks used for this purpose because they are designed to protect the disc from damage rather than be receptive to an ink. Therefore a further coating is necessary to provide a suitable anchor for the marking inks. The present invention concerns a coating, in particular, an ink, designed for this purpose.

In order for the coating to be suitable, the coating must adhere to the CD without cracking or peeling. Moreover, the coating must allow surface wetting by the ink jet ink while maintaining acceptable levels of print definition. The ink-jet ink must be absorbed into the coating.

Inks for creating thermal drop-on-demand ink-jet receptive surfaces on polycarbonate substrates are known. In general the ink needs to contain a water compatible component in order to absorb the thermal ink-jet ink, which usually contains high amounts of water.

A type of ink used to create thermal drop-on-demand ink-jet receptive surfaces which is well known in the art uses a solution of a resin in solvent, which is printed and then dried by evaporation of the solvent. Use of these inks risks the release of volatile solvent to the environment, a hazardous procedure that must be prevented or controlled.

A second type uses a permanently water soluble resinous binder cast from a water and solvent solution.

For environmental reasons inks not formulated with volatile solvents are preferred. Such inks are known, and are cured or dried by ultraviolet radiation. They contain ethylenically unsaturated monomers and a photopolymerization initiator.

JP 2000-34435 describes an ultra-violet curable ink suitable for use as a receptive coating for CD-R's which describes the use of a water-soluble liquid monomer, a hydrophobic polymer, which is soluble in that monomer, and an inorganic filler. In general, liquid water-soluble monomers described in this invention tend to have unpleasant toxicological properties which are not desirable for use in the screen printing process, which is the normal method of application.

In accordance with the present invention there is provided a coating for producing an ink jet print receptive surface on coated or uncoated polymer substrates; the coating comprising a water soluble salt of acrylamidoalkanesulfonic acid, one or more ethylenically unsaturated monomers or oligomers capable of being photopolymerized by ultra-violet radiation, one or more functional extender pigments, and one or more photoinitiators.

In accordance with the present invention there is also provided a method of preparing an ink receptive surface on a substrate, the method comprising the steps of:
  coating the substrate with a coating comprising a water soluble salt of acrylamidoalkanesulfonic acid, one or more ethylenically unsaturated monomers or oligomers capable of being photopolymerized by ultra-violet radiation, one or more functional extender pigments, and one or more photoinitiators; and
  curing the coating with UV radiation.

The coating of the present invention uses solid water-soluble monomers which have no significant toxicological properties and are of low hazard.

The coating of the present invention is preferably an ink but may also be a coatable lacquer.

For use in practice, it is also desirable to use materials which are of low hazard to the operators, and which have low impact on the environment. It is also desirable that the coating adheres well and cures under the influence of ultra-violet radiation without needing an intermediate heating stage.

The preferred water-soluble monomers are salts of acrylamidoalkanesulfonic acids of molecular weight less than 600, most preferably between 224 and 237, of which the sodium salt of 2-acrylamido-2-methylpropanesulfonic acid is most preferred. The coating preferably includes at least one monomer of this class.

Additional water soluble or dispersible monomers or oligomers with functionalities between 1 and 3, preferably 2, may be used to adjust adhesion, hardness, water sensitivity and film integrity. The combined concentration by weight of the monomers or oligomers is preferably between 10 and 90%, more preferably between 30 and 80%, and most preferably around 50%.

The photoinitiators of the present invention are well known, and may be any selection of free-radical generating species known in the art which give acceptable curing, for example, the Darocure range from Ciba Specialty Chemicals. The combined concentration by weight of these initiators is between 1 and 10%, preferably between 3 and 7%, and most preferably around 5%.

The functional extender pigment is chosen to maximize surface wetting by creating a high surface tension. Particle size may be optimized for protecting the ink-jet ink from abrasion. These pigments may be used in combination to adjust several properties simultaneously. The combined weight concentration of pigments is between 5 and 25%, preferably between 10 and 20%, and most preferably around 17%. White coatings may be made by the incorporation of titanium dioxide at weights between 5 and 30%, preferably between 15 and 25%, and most preferably around 25%. Such pigments are well known and commercially available such as, for example, under the tradename TiPure from E. I. DuPont.

Ink jet print definition can be controlled by the addition of a modified alkylpolysiloxane copolymer at amounts between 0.1 and 1.0%, preferably between 0.3 and 0.7%, and most preferably around 0.5%. This class of additives is well known and commercially available such as, for example, the BYK 300 series from Byk-Chemie.

Other constituents of the types known to those in the art for the formulation of uv-curable coatings are optionally present. In order to adjust film hardness, flexibility and adhesion properties, a blend of passive (non-reactive) resins may be selected such as, for example, polymethylacrylates, polybutylacrylates, polymethylmethacrylates, polybutylmethacrylates and copolymers thereof, polyvinylalcohols, polyvinylpyrrolidones, polyvinylacetates or reactive oligomers, such as urethaneacrylates, epoxyacrylates and polyesteracrylates. Surface properties may be adjusted using surfactants, defoamers, slip- and flow-aids and matting agents. Also stabilisers may be used against heat and light, biocides and identifying tracers.

The inks may be made by any method known in the art such as, for example, by stirring, and milling of the pigments and extender pigments.

The ink-jet receptive coatings are suitable for application to thermoplastic substrates made of especially, polycarbonate and such substrates coated with UV spin-coated lacquers. Application of the ink-jet receptive layer may be by, for example, screen stencil printing, spin coating, roller coating, offset printing and flexographic printing. The preferred application method is screen stencil printing. After application to the substrate it is not necessary to heat the coating. The coating is hardened by exposure to ultra-violet light, preferably of wavelength between 250 and 450 nanometres. The irradiation may be by passing the print under a mercury vapour lamp. After irradiation with ultraviolet light the coating exhibits good adhesion to the substrate. Additional UV exposure or protracted storage will not affect the ink jet receptivity of the coating. The coated article may then be printed upon with an appropriate ink-jet printer such as the Primera Signature II or Seiko Precision CD printer 2000.

The invention will now be described with reference to the following examples:

EXAMPLE 1

The following components were mixed in the order given on a Cowles CM-100 Disperser:

| | |
|---|---|
| 2-Acrylamido-2-methylpropanesulfonic Acid sodium salt as 50% solution in water | 63.9 |
| Polyethyleneglycol diacrylate 400 | 6.39 |
| 2-hydroxy-2-methyl-1-phenyl-1-propanone | 3.19 |
| modified silicone(eg BYK 321) | 0.96 |
| magnesium carbonate pigment | 25.56 |

The product was a milky appearing ink. This ink was printed using a 390 threads per inch (tpi) twill mesh on to a spincoated CD disc and passed at 50 fpm under a 200 watt uv drier. The coated disc was then printed with the Primera Signature II ink-jet printer and exhibited good adhesion and print definition.

EXAMPLE 2

The following were mixed in the order given on a Cowles CM-100 Disperser:

| | |
|---|---|
| 2-Acrylamido-2-methylpropanesulfonic Acid sodium salt as 50% solution in water | 63.9 |
| Tri-propyleneglycol Diacrylate | 6.39 |
| 2-hydroxy-2-methyl-1-phenyl-1-propanone | 3.19 |
| modified silicone (BYK 320) | 0.96 |
| magnesium carbonate pigment | 25.56 |

The product was a milky appearing ink. This was printed using a 390 tpi twill mesh on to a spincoated CD disc and passed at 50 fpm under a 200 watt uv drier. The coated disc was then printed with a Seiko Precision CD printer 2000 and exhibited good adhesion and print definition.

EXAMPLE 3

The following were mixed in the order given on a Cowles CM-100 Disperser:

| | |
|---|---|
| 2-Acrylamido-2-methylpropanesulfonic Acid sodium salt as 50% solution in water | 57.51 |
| Polyethyleneglycol diacrylate | 6.39 |
| Actilane SPO 61 (Urethane Acrylate) | 6.39 |
| 2-hydroxy-2-methyl-1-phenyl-1-propanone | 3.19 |
| modified silicon (BYK 321) | 0.96 |
| magnesium carbonate pigment | 25.56 |

The product was a milky appearing ink. This was printed using a 390 tpi twill mesh on to a spincoated CD disc and passed at 50 fpm under a 200 watt uv drier. The coated disc was then printed with a Seiko Precision CD printer 2000 and exhibited good adhesion and print definition.

EXAMPLE 4

The following were mixed in the order given.

| | |
|---|---|
| 2-Acrylamido-2-methylpropanesulfonic Acid sodium salt as 50% solution in water | 57.51 |
| Polyvinyl acetate emulsion | 12.78 |
| 2-hydroxy-2-methyl-1-phenyl-1-propanone | 3.19 |
| modified silicone | 0.96 |
| magnesium carbonate pigment | 25.56 |

The product was a milky appearing ink. This was printed using a 390 threads per inch (tpi) twill mesh on to a spincoated CD disc and passed at 50 fpm under a 200 watt uv drier. The coated disc was then printed with an Epson ink-jet printer and exhibited good adhesion and print definition.

EXAMPLE 5

The following were mixed together to give component A:

| | |
|---|---|
| Actilane SPO 41 (Urethane Acrylate) | 14 |
| Tri-propylene glycol diacrylate | 8 |
| Highly Ethoxylated Trimethyl propane triacrylate | 12 |
| Darocure 1173 | 0.5 |
| Irgacure 369 | 0.5 |
| Poloral 8022 (polyester resin) | 5 |
| Di-Trimethyl propane triacrylate | 3 |
| Defoamer(eg BYK 035) | 1 |
| Genorad 16 (stabiliser) | 0.5 |
| Supreme Grade Clay (ECC) | 0.6 |
| Alcoprint PTF (thickener) | 0.5 |
| Distilled water | 44 |
| Aqua Polyfluo 411 (scuff aid) | 4 |
| | 100 |

Component A was then mixed with the following in the ratios indicated below:

| | |
|---|---|
| 2-Acrylamido-2-methylpropanesulfonic Acid sodium salt as 50% solution in water | 45 |
| Solution 30% Ghosenol GL-05(Polyvinyl alcohol) in distilled water | 27 |
| Component A | 18 |
| Silica matting agent | 10 |
| | 100 |

This was printed using a 390 tpi twill mesh on to a spincoated CD disc and passed at 50 fpm under a 200 watt uv drier. The coated disc was then printed with a Seiko Precision CD printer 2000 and exhibited good adhesion and print definition.

The invention claimed is:

1. A coating composition for producing an ink-jet print receptive surface on pre-coated or uncoated polymer substrates, the coating composition comprising: (a) an aqueous solution of a solid, water-soluble salt of acrylamidoalkanesulfonic acid, (b) one or more ethylenically unsaturated monomers, other than the solid, water-soluble salt of acrylamidoalkanesulfonic acid, or oligomers capable of being photopolymerized by ultra-violet radiation, (c) one or more functional extender, pigments which increase the surface tension to maximize wetting and (d) one or more photoinitiators.

2. The coating composition claimed in claim 1, wherein the composition is an ink.

3. The coating composition as claimed in claim 1, wherein the solid, water-soluble salt of acrylamidoalkanesulfonic acid has a molecular weight less than 600.

4. The coating composition as claimed in claim 3, wherein the solid, water-soluble salt of acrylamidoalkanesulfonic acid is sodium 2-acrylamido-2-methylpropane sulfonate.

5. The coating composition of claim 1, wherein the monomers or oligomers have from 1 to 3 ethylenically unsaturated groups.

6. The coating composition of claim 1, wherein the monomers or oligomers are present in an amount between 10 and 90% of the total weight of the coating composition.

7. The coating composition of claim 1, wherein the initiator is present in an amount between 1 and 10% of the total weight of the coating composition.

8. The coating composition of claim 1, wherein the pigment is present in an amount between 5 and 25% of the total weight of the coating composition.

9. The coating composition of claim 1, wherein the coating composition further includes a modified silicone.

10. The coating composition claimed in claim 9, wherein the modified silicone is an alkypolysiloxane copolymer.

11. The coating composition claimed in claim 9, wherein the modified silicone is present in an amount between 0.1 and 1.0% of the total weight of the coating.

12. The coating composition claimed in claim 9, wherein the modified silicone is present in an amount between 0.3 and 0.7% of the total weight of the coating.

13. The coating composition claimed in claim 9, wherein the modified silicone is present in an amount of around 0.5% of the total weight of the coating.

14. The coating composition claimed in claim 1, wherein the coating composition further includes a non-reactive polymer or resin.

15. The coating composition as claimed in claim 1, wherein the solid, water-soluble salt of acrylamidoalkanesulfonic acid has a molecular weight between 224 and 237.

16. The coating composition claimed in claim 1, wherein the monomers or oligomers are present in an amount between 30 and 80% of the total weight of the coating composition.

17. The coating composition claimed in claim 1, wherein the monomers or oligomers are present in an amount around 50% of the total weight of the coating composition.

18. The coating composition of claim 1 wherein the initiator is present in an amount between 3 and 7% of the total weight of the coating composition.

19. The coating composition of claim 1 wherein the initiator is present in an amount of around 5% of the total weight of the coating composition.

20. The coating composition of claim 1, wherein the pigment is present in an amount between 10 and 20% of the total weight of the coating composition.

21. The coating composition of claim 1, wherein the pigment is present in an amount of around 17% of the total weight of the coating composition.

22. The coating composition claimed in claim 1, wherein the water is present in an amount of about 50% of the total weight of the aqueous solution of a solid, water-soluble salt of acrylamidoalkanesulfonic acid.

23. A method of preparing an ink-receptive surface on a substrate, the method comprising the steps of: coating the substrate with the coating composition of claim 1 and curing the coating composition with UV radiation.

24. The method claimed in claim 23, wherein the substrate is polycarbonate.

25. The method claimed in claim 23, wherein the substrate is uncoated.

* * * * *